United States Patent Office 3,102,109
Patented Aug. 27, 1963

3,102,109
AZO DYES
Willy Steinemann, Basel, Switzerland, assignor to Sandoz Ltd., Basel, Switzerland
No Drawing. Filed July 12, 1960, Ser. No. 42,244
Claims priority, application Switzerland July 17, 1959
6 Claims. (Cl. 260—146)

This invention relates to azo dyes which contain in the molecule at least once the group

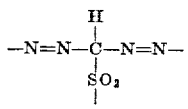

They are preferably of the general Formula I and may be metallized.

In the general formula

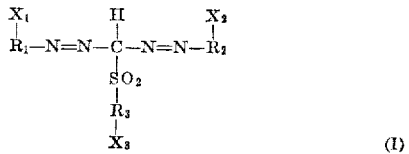

$R_1$ and $R_2$ represent radicals of diazo components, $X_1$ a substituent in ortho position to the azo group which is capable of metal complex formation, $X_2$ hydrogen or a substituent which is capable of metal complex formation, both in ortho position to the azo group, $R_3$ a hydrocarbon radical which may be substituted, and $X_3$ hydrogen or the radical

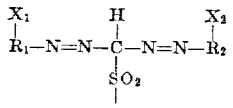

in which $R_1$, $R_2$, $X_1$ and $X_2$ have the meaning indicated above.

These dyestuffs may contain in the molecule at least once an amino, hydroxy or thiol group which contains a reactive hydrogen atom and is combined directly or through a divalent radical, in addition to which they may contain further substituents.

A further object of this invention is the process for the production of the said dyestuffs of Formula I and of their metal complex compounds, as well as their use for the dyeing of fibers and fiber materials and the products thus dyed.

The process for the production of the dyes (I) comprises reacting one mole of a hydrocarbon which contains $n$ radicals of the general formula

in which Z represents a carboxylic acid group or a group convertible into the said group and $n$ a low integer, preferably 1 or 2, with $2n$ moles of a diazo compound, of which at least one mole contains a substituent in ortho position to the diazo group which is capable of metal complex formation, the resulting dyestuffs being subsequently metallized if desired.

With all the dyestuffs of the invention metallization can be carried out in substance or on the fiber.

The hydrocarbons containing $n$ radicals of the general Formula II which are employed as starting compounds include, e.g. those in which $n$ is 1–3 and, in particular, those in which $n$ is 1 or 2. If Z is not a carboxylic acid group it must be one which is convertible into such a group, e.g. a carboxylic acid ester group, preferably with 1–4 carbon atoms in the saturated aliphatic monovalent alcoholic component of the ester, or again a carboxylic acid amide or nitrile group.

These groups can be converted into a carboxylic acid group before the aforestated reaction is performed, though usually conversion takes place of itself during the reaction. The hydrocarbons containing the radical (II) can be aliphatic radicals, in particular methyl to butyl or also hexyl, cycloaliphatic hydrocarbon radicals such as cyclohexyl, aromatic radicals such as phenyl or naphthyl, or generally saturated or unsaturated but preferably non-polymerizable hydrocarbon radicals, especially those with up to 10 carbon atoms.

The hydrocarbons containing the radical (II) can be further substituted, e.g. by the substituents mentioned in the following enumeration of the applicable azo compounds.

One mole of such a compound containing $n$ times the radical (II) in the molecule is coupled with $2n$ moles of the diazo compound.

Any of the diazo compounds commonly used in the chemistry of azo dyestuffs can be chosen, i.e. diazotized aromatic and heterocyclic amines of aromatic character. Preference is given to mono- or dinuclear amines of this type, which may be further substituted in the nuclei, e.g. by radicals or groups which are water-solubilizing and/or do not increase or in fact reduce the water-solubility of the dyestuffs. Examples of such substituents are sulfonic acid groups, carboxylic acid groups, sulfonic acid amide groups which may be N-mono- or disubstituted, sulfonic groups (—$SO_2$—), alkyl groups, particularly those with up to 4 carbon atoms, alkoxy groups, aryl groups, especially phenyl or naphthyl radicals, nitro groups or halogen atoms, especially fluorine, chlorine or bromine.

At least the moiety of the $2n$ moles of diazo compound employed contains in ortho-position to the diazo group a substituent capable of metal complex formation which is preferably a hydroxyl, carboxyl, amino or sulfamide group, or a group such as an alkyloxy group which can be converted into one of the aforenamed groups before or during the metallizing reaction.

The diazo components as well as the coupling components can contain azo groups and may themselves be metallizable or metallized. They can contain further substituents which are capable of dyestuff formation, e.g. of azo dyestuffs. In this way polyazo dyestuffs can be produced from them by azo coupling. Substituents capable of azo dyestuff formation are diazotizable amino groups and substituents convertible into such, e.g. reducible nitro groups or easily hydrolyzable acylamino groups or coupling hydrogen atoms.

The diazo compounds are coupled with the radical (II) containing hydrocarbon under the normal conditions, e.g. in a weekly acid, neutral or alkaline medium and preferably at ph 5 to 12. The alkaline pH value can be obtained in the usual manner by the addition of an agent of alkaline reaction, e.g. basic metal hydroxides or metal carbonates, more especially the alkali or earth alkali metals or magnesium. The coupling reaction can be effected in a purely aqueous medium or in a predominantly organic medium. Often the addition of an amount of an organic solvent 1 to 5 times greater (by weight) than that of the coupling component is beneficial. Suitable solvents of this type are e.g. formamides, particularly dimethyl formamide, hydrocarbons which may be substituted, e.g. chlorobenzene, and pyridine. Dispersing agents can also be employed. The coupling reaction is conducted preferably at temperatures between about —10° and +35° C., although lower or higher temperatures are applicable depending on the nature of the components and the solvent and diluent.

At least one of the components used for forming the azo dyestuffs (I) can contain an amino, hydroxy or thiol group which has a reactive hydrogen atom and is combined directly or through a divalent radical, or a substituent convertible into such a group. Examples of such substituents are the nitro group which can be converted into the amino group by reduction, an acylamino group which is subsequently saponified, or a halogen atom which is replaced by the amino group. Further, a halogen atom can be converted into a hydroxy or thiol group by the normal methods, e.g. through the thiouronium salts, or an amino group can ge converted into a hydroxy or thiol group. These amino, hydroxy or thiol groups, or the substituents convertible into them, can be combined with the dyestuff molecule directly or indirectly through a divalent radical. This divalent radical can be, e.g., an aliphatic chain which itself can be combined to the dyestuff molecule by a bridge member. As examples of aliphatic chains may be mentioned the following:

—CH$_2$—, —CH$_2$CH$_2$—, —CH$_2$—CH$_2$—CH$_2$—,

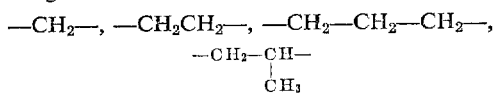

or —CH$_2$—CH$_2$—CH$_2$—CH$_2$—.

Examples of suitable bridge members are: —SO$_2$—, —CO—, —O—, —S—,

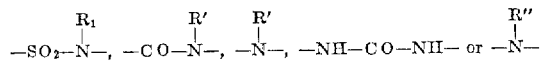

wherein R' represents hydrogen, low molecular alkyl or hydroxyalkyl, cycloalkyl, aralkyl or aryl, and R" acyl. Also, the aliphatic chain and the bridge members can jointly form the divalent radical.

For metallizing the dyestuffs of Formula I in substance copper- or nickel-yielding agents are preferably used, e.g. copper formate, copper acetate, copper sulfate, or the corresponding nickel compounds. Coppering can be carried out by several methods, for example by heating the dyestuff with the copper salt in a weekly acid to alkaline medium, if necessary with pressure, and/or in presence of ammonia and/or organic bases, or in concentrated aqueous solutions of the alkali salts of low molecular aliphatic monocarboxylic acids.

The new dyestuffs of the Formula I are suitable for the most varied purposes for example for dyeing, padding and printing textile materials. Those free of solubilizing groups can be employed as disperse dyes or pigments for the dyeing or coloration of artificial fibers, plastics and lacquers. Dyestuffs with water-solubilizing groups, e.g. members of the sulfonic acid, sulfonic acid amide, sulfonyl or carboxylic acid groups, find employment for dyeing textiles of all kinds. Many of the products, e.g. those of low molecular weight, can be successfully used for dyeing wool, silk, polyamid fibers, polyterephthalic acid glycol esters and leather, and as they contain substituents capable of metal complex formation they can be metallized in substance or on the fiber. Others, e.g. the high molecular dyestuffs containing metal in complex combination or substituents capable of metal complex formation, are used for dyeing natural cellulose such as cotton, regenerated cellulose such as viscose rayon, acylated cellulose such as secondary acetate and triacetate, and leather.

The dyeings obtained are deep, very brilliant, fast to light, boiling, milling and perspiration, and stable to acids.

In the aftertreatment of dyeings of metal-free dyestuffs with metal-yielding agents, which are preferably nickel or copper compounds, addition of a polyalkylene polyamine is beneficial. Compounds of other metals, for example of chromium, cobalt or zinc, can be used if desired.

In the following examples the parts and percentages are by weight and the temperatures in degrees centigrade.

*Example 1*

26.1 parts of 2-amino-1-hydroxybenzene-4-sulfonic acid phenyl amide are diazotized in 100 parts of water and 18 parts of 30% hydrochloric acid at 0–5°. The neutralized, ice-cold diazo suspension is run into a well stirred solution of 13.8 parts of 4-methylsulfaminobenzenesulfonyl acetic acid in 300 parts of 10% sodium hydroxide solution at a temperature not higher than 0°. The whole is stirred at 0–2° until the coupling reaction has run its course, on which 500 parts of water are added and the new dyestuff precipitated by neutralization with dilute hydrochloric acid. It is collected on a filter, washed with cold water and suspended in a solution of 13 parts of copper sulfate and 30 parts of crystallized sodium acetate in 800 parts of water for conversion into its copper complex. The metallizing mass is stirred at 85–90° until no further trace of uncoppered dyestuff is indicated in a chromatogram developed with dilute sodium hydroxide solution. On cooling to 40° the completely precipitated copper complex is filtered off, washed with cold water, dried and ground. It is now a dark-colored powder which dissolves in water with a blue coloration. It is dyed on wool and polyamide fibers from a neutral bath to give blue-gray shades of very good fastness to light and milling.

The analogously produced cobalt and nickel complexes of this dyestuff possess similar affinity for these fibers from a neutral bath and give dyeings of blue-gray or grayish red shade respectively.

Dyestuffs of comparable excellence which give dyeings with very similar shades are obtained when the 13.8 parts of 4-methylsulfaminobenzene-sulfonyl acetic acid used in the example are replaced by the equivalent amount of:

Dimethylaminosulfamino-benzene-sulfonyl acetic acid,
2-(or 4) methylbenzenesulfaminobenzene-sulfonyl acetic acid,
3-(or 4) acetamino-benzene-sulfonyl acetic acid,
2-acetamino-4-methoxy-benzene-sulfonyl acetic acid,
2-(3 or 4)-methyl-benzene-sulfonyl acetic acid,
4-chloro-benzene-sulfonylacetic acid,
4-benzoylamino-benzene-sulfonyl acetic acid,
4-oxazolidonyl-benzene-sulfonyl acetic acid,
4-pyrrolidonyl-benzene-sulfonyl acetic acid,
4-methoxy-(or 4-ethoxy)-benzene-sulfonyl acetic acid,
2,5-dimethoxy-4-acetamino-benzene-sulfonyl acetic acid,
4-chloro-3-carboxy-benzene-sulfonyl acetic acid,
3-carboxy-benzene-sulfonyl acetic acid,
Benzene-sulfonyl acetic acid,
4 (or 5, or 6)-acetamino-naphthalene-(2)-sulfonyl acetic acid,
4 (or 5)-acetamino-naphthalene-(1)-sulfonyl-acetic acid,
Naphthalene-(1)-sulfonyl-acetic acid-4-sulfonic acid,
Methylsulfonyl acetic acid,
n-Butyl-sulfonyl-acetic acid or
Cyclohexyl-sulfonyl acetic acid, or when the 26.1 parts of 2-amino-1-hydroxybenzene-4-sulfonic acid phenyl amide are replaced by the equivalent amount of:

2-amino-1-hydroxy-benzene-5-sulfonic acid phenylamide,
2-amino-1-hydroxy-benzene-4-(or 5)-sulfonic acid amide
2-amino-1-hydroxybenzene-4 (or 5)-sulfonic acid-methylamide,
2-amino-1-hydroxybenzene-4 (or 5)-sulfonic acid isopropylamide,
2-amino-1-hydroxybenzene-4 (or 5)-sulfonic acid amylamide
2-amino-1-hydroxybenzene-4 (or 5)-sulfonic acid cyclohexyl amide,
2-amino-1-hydroxybenzene-4 (or 5)-sulfonic acid 2'-hydroxyethylamide,
2-amino-1-hydroxybenzene-4 (or 5)-sulfonic acid 2'-hydroxybutylamide,
2-amino-1-hydroxybenzene-4 (or 5)-sulfonic acid 2'-methoxyethylamide, 2-amino-1-hydroxybenzene-4 (or 5)-sulfonic acid 3'-methoxypropylamide,
2-amino-1-hydroxybenzene-4 (or 5)-sulfonic acid 3'-sulfamidophenylamide, or -o-carboxy-phenylamide,
2-amino-1-hydroxybenzene-4 (or 5)-sulfonic acid dimethylaminopropylamide or -dimethylamide.

Example 2

25.8 parts of 2-amino-1-hydroxybenzene-4-sulfonic acid morpholide in a mixture of 25 parts of 30% hydrochloric acid and 150 parts of water at 0° are diazotized with 6.9 parts of sodium nitrite. The diazo suspension is neutralized with 7 parts of sodium carbonate and run into an ice-cold solution of 11 parts of 4-methylbenzenesulfonyl acetic acid in 260 parts of 10% sodium hydroxide solution. Stirring is continued at 0° until the diazo component is no longer indicated, upon which 40 parts of sodium bicarbonate are added and the new dyestuff salted out with sodium chloride and filtered with suction. The moist product is added with thorough stirring to a solution of 14 parts of copper sulfate, 20 parts of 25% aqueous ammonia solution and 1000 parts of water at 80° and the mass stirred further at 90° to bring about formation of the copper complex. The corresponding cobalt and nickel complexes can be produced in exactly the same way.

These complexes have affinity for wool and polyamide fibers from a neutral bath, and dye the former fiber in blue-grey and the latter in greyish red shades. The dyeings are very fast to light and milling.

Example 3

30.8 parts of 2-amino-1-hydroxy-4-nitrobenzene are dissolved in 250 parts of water by the addition of 32 parts of 30% hydrochloric acid, diazotized at 0° with 13.8 parts of sodium nitrite and neutralized with sodium carbonate. The resulting diazo suspension is run into an emulsion at not more than 0° which is prepared by dissolving 34.2 parts of 5-methylsulfaminonaphthaline-(2)-sulfonylacetic acid amide in 250 parts of 10% sodium hydroxide solution at 85°, cooling to 0° and adding 20 parts of pyridine, 20 parts of chlorobenzene and a solution of 125 parts of 20% copper sulfate and 20 parts of triethanolamine. The mass is stirred at 0° until the coupling reaction is completed and is then heated to 50° and dilute hydrochloric acid added until the copper-containing dyestuff is precipitated. It is filtered off and purified by redissolving or recrystallization. The copper complex dyestuff dyes wool and polyamide fibers in bright navy shades of very good fastness to light and milling. The nickel complex of this dyestuff obtained by the same procedure gives more reddish navies of equally good light and milling fastness.

When the 30.8 parts of 2-amino-1-hydroxy-4-nitrobenzene are replaced by the equivalent amount of 2-amino-1-hydroxy-5-nitrobenzene,
2-amino-1-hydroxy-4-nitro-6-chlorobenzene,
2-amino-1-hydroxy-4-chlorobenzene,
2-amino-1-hydroxy-4,6-dichlorobenzene or
2-amino-1-hydroxy-4-tert. butylbenzene, the dyestuffs obtained by the same operating procedure are very similar to the above and possess equally good fastness properties.

Example 4

30 parts of 2-aminobenzene-1-carboxylic acid are dissolved in 150 parts of water with 36 parts of 30% hydrochloric acid. The solution is cooled to 0° and diazotized at this temperature with 15.2 parts of sodium nitrite. The diazo solution is adjusted to pH 8.5 with sodium carbonate and poured into an ice-cold solution of 23.6 parts of sodium-4-methylbenzenesulfonyl acetate in 200 parts of water. Over the next two hours 200 parts of a 10% sodium hydroxide solution are added dropwise at an even rate and at the constant temperature of 0°. On completion of coupling the disazo dyestuff so formed is precipitated with dilute hydrochloric acid and filtered off. The product is entered in a well stirred solution at 80–90° of 35 parts of crystallized sodium acetate in 300 parts of water, and at 90–100° a sufficient amount of a 20% copper sulfate solution is added sufficient to indicate a continuous excess of copper ions. The metallizing mass is cooled to room temperature and the precipitated copper complex filtered off, dried and ground. It is a red powder and dyes polyamide fibers and leather in bright, fast red shades.

In the same way the nickel complex of this dyestuff can be produced, which dyes polyamide fibers and leather in bright fast green shades.

Example 5

29.2 parts of 2-amino-1-carboxybenzene-5-sulfonic acid phenylamide are dissolved in a solution of 23 parts of 30% sodium hydroxide solution in 150 parts of water at 80°. After the addition of 7.2 parts of sodium nitrite the solution is dropped at an even rate into 200 parts of well stirred 9% sulfuric acid at 0–5° in the course of 1½ hours. The temperature of the reaction mass is increased to 10° and it is stirred at this temperature until diazotization is completed. The resulting diazo suspension is cooled to 0°, neutralized with sodium carbonate and run into an ice-cold solution of 19 parts of sodium 4-dimethyl-aminosulfaminonaphthalene-(1)-sulfonyl acetate in 250 parts of water. Simultaneously 100 parts of 5% sodium hydroxide solution are added dropwise and stirring is continued at 0° until the reaction is completed. To isolate the dyestuff 20 parts of sodium bicarbonate are added to the coupling mass. It is salted out with sodium chloride, filtered off, washed with sodium chloride solution, and in the moist state is treated with a copper yielding agent as described in Example 1 to give the copper complex. The copper complex dyes wool, silk and polyamide fibers from a neutral or weakly acid bath in bright red-blue shades which show very good fastness to light and wet treatments. The nickel complex produced in an analogous manner gives very fast green dyeings.

Example 6

43.4 parts of 1-amino-2-carboxybenzene-4-sulfonic acid are diazotized in a mixture of 200 parts of water and 11.5 parts of 30% hydrochloric acid at 0° with 13.8 parts of sodium nitrite. To the neutral and well cooled diazo solution are added 25.7 parts of finely ground 4-acetylaminophenyl-1-sulfonyl acetic acid and 20 parts of a mixture of pyridine bases. In the course of several hours 200 parts of 10% sodium hydroxide solution are dropped in at a constant rate of addition with good cooling. When the coupling reaction is effected, 125 parts of a copper sulfate solution, alkalified with 30 parts of 25% aqueous ammonia solution and having a $CuSO_4.5H_2O$ content of 20% are added. The mass is then heated to 60° until formation of the complex and if desired subsequently to 90–95° in order to saponify the acetylamino group.

Bright, fast blue-red dyeings are produced with this dyestuff. The corresponding nickel-containing dyestuff gives fast green dyeings.

Example 7

53.8 parts of 1-amino-2-hydroxybenzene-3,5-disulfonic acid are diazotized in a mixture of 200 parts of water and 4 parts of 30% hydrochloric acid at 0° with 13.8 parts of sodium nitrite. To the diazo solution are added 34.8 parts of finely ground 4-carbethoxyaminonaphthyl-1-sulfonyl acetic acid and 20 parts of pyridine, followed by 280 parts of 10% sodium hydroxide solution which is added dropwise at an even rate in the course of several hours at 0–2°. On completion of coupling are added 125 parts of an aqueous copper sulfate solution containing 20% $CuSO_4.5H_2O$ and previously alkalified with 30 parts of 25% aqueous ammonia solution. The temperature is increased to 60° until complete formation of the complex and if desired is subsequently raised to 90–95° to saponify the carbethoxyamino group. The metallizing mass is cooled to room temperature with ice and the product precipitated and treated in the usual way to give the dyestuff.

*Example 8*

55.2 parts of 1-amino-2-hydroxy-5-carbethoxyamino-benzene-3-sulfonic acid are suspended in an ice-cold solution of 200 parts of water and 26 parts of 30% hydrochloric acid and diazotized with 13.8 parts of sodium nitrite. 24.4 parts of finely ground 3-carboxyphenylsulfonyl acetic acid are added to the yellow diazo solution, then 250 parts of 10% sodium hydroxide solution are dropped in over several hours at an even rate at 0°, and stirring is continued at this temperature until completion of the coupling reaction. A solution of 25 parts of crystallized copper sulfate in 100 parts of water, neutralized with 30 parts of 25% aqueous ammonia solution, is added to the reaction solution, which is then heated to 60° to bring about formation of the complex and subsequently to 90–95° if desired to saponify the carbethoxyamino group.

*Example 9*

44.7 parts of 1-amino-2-hydroxy-5-chlorobenzene-3-sulfonic acid are diazotized in the normal way. Enough sodium carbonate is added to the yellow diazo solution at 0° to bring the pH to 9.5 and this is followed by the addition of 21 parts of finely ground 1-acetamino-naphthalene-3,6-disulfonyl acetic acid and 20 parts of a mixture of pyridine bases. In the course of several hours 280 parts of 10% sodium hydroxide solution are added dropwise at an even rate at 0°. On completion of coupling a solution of a complex cuprous salt is added, which is prepared from 125 parts of an aqueous solution containing 20% CuSO₄.5H₂O and 30 parts of triethanolamine, and the mass is heated at 40–50° until no further metal-free dyestuff is indicated. Acetic acid is added to isolate the copper-containing dyestuff which is then salted out, filtered off, dried and ground. It is a dark-colored powder which dissolves in water with a deep blue coloration and is suitable for dyeing wool, silk and polyamide fibers in bright blue shades.

Formulae of representative dyestuffs of the foregoing examples are as follows.

Example 1:

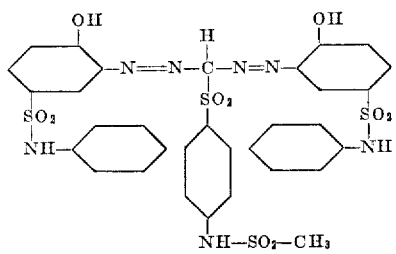

Example 2:

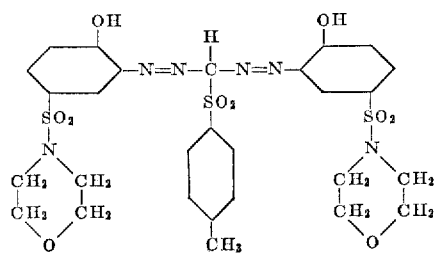

Example 3:

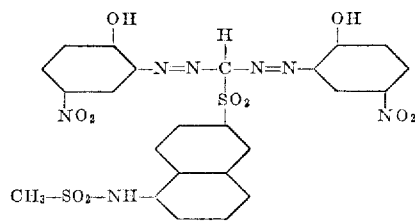

Example 4:

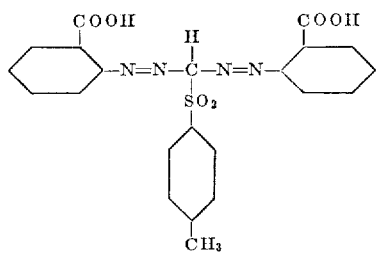

Example 5:

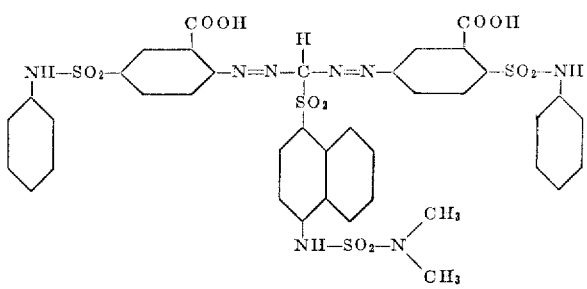

Example 6:

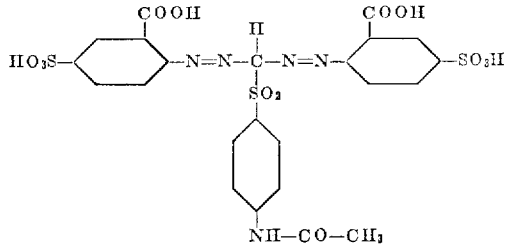

Example 7:

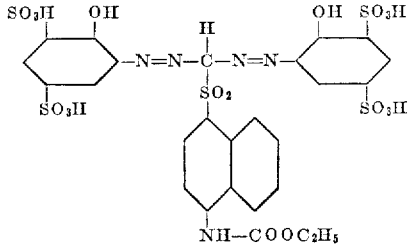

Example 8:

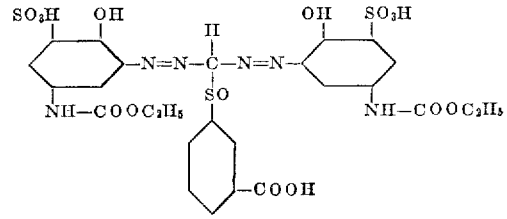

Example 9:

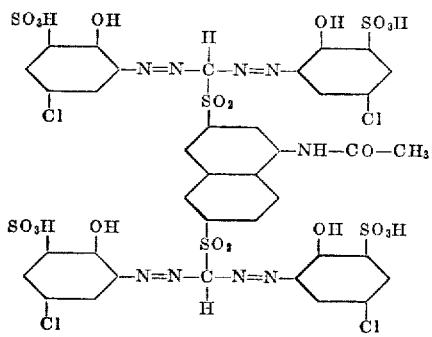

Having thus disclosed the invention what I claim is:
1. Metallized azo complex dyes selected from the group consisting of copper, nickel and cobalt complex dyes which in metal-free form are of the formula

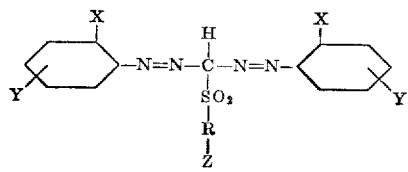

wherein

X is a member selected from the group consisting of hydroxy and carboxy,

Y is a member selected from the group consisting of hydro, chloro, nitro, sulfonic acid, tertiary butyl, carbethoxyamino, sulfonic acid amide, sulfonic acid methylamide, sulfonic acid isopropylamide, sulfonic acid amylamide, sulfonic acid phenylamide, sulfonic acid cyclohexylamide, sulfonic acid hydroxyethylamide, sulfonic acid hydroxy butylamide, sulfonic acid methoxy ethylamide, sulfonic acid methoxy propylamide, sulfonic acid sulfamido phenylamide, sulfonic acid carboxy phenylamide, sulfonic acid dimethylamide, sulfonic acid dimethylaminopropylamide, and sulfonic acid morpholide, R is a member selected from the group consisting of phenyl, methylbenzenesulfaminophenyl, dimethylaminosulfaminophenyl, methylsulfaminophenyl, acetaminophenyl, methoxyphenyl, ethoxyphenyl, methylphenyl, chlorophenyl, benzoylaminophenyl, oxazolidonylphenyl, pyrrolidonylphenyl, carboxyphenyl, carbethoxyaminonaphthalene, acetaminonaphthalene, dimethylaminosulfaminonaphthalene, naphthalene sulfonic acid, methylsulfaminonaphthalene, methyl, n-butyl, and cyclohexyl, and Z is a member selected from the group consisting of hydrogen and the radical

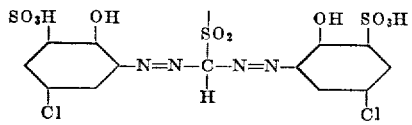

Z being said aforementioned radical only where R is 1-acetaminonaphthalene.

2. Copper complex compound of the azo dye of the formula

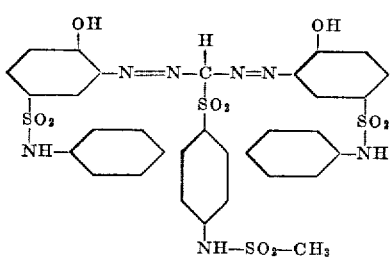

3. Copper complex compound of the azo dye of the formula

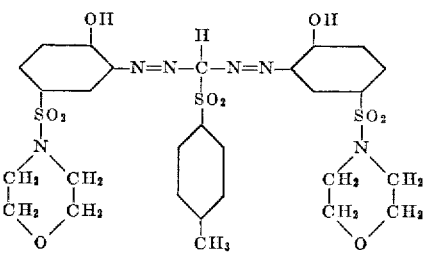

4. Copper complex compound of the azo dye of the formula

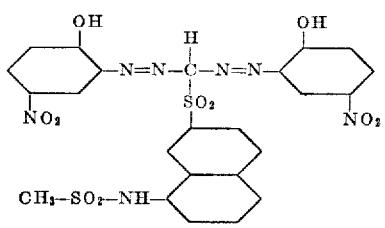

5. Copper complex compound of the azo dye of the formula

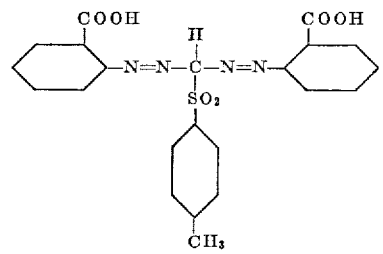

6. Copper complex compound of the azo dye of the formula

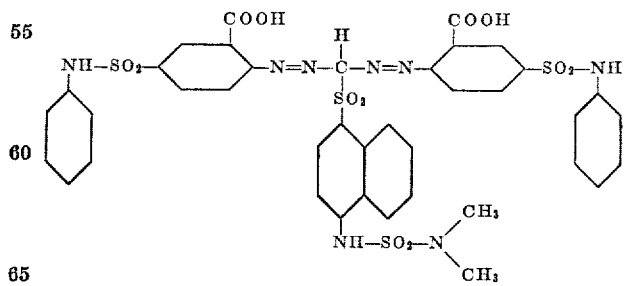

References Cited in the file of this patent
UNITED STATES PATENTS

| | | |
|---|---|---|
| 2,200,005 | McNally et al. | May 7, 1940 |
| 2,366,633 | Long | Jan. 2, 1945 |
| 2,841,577 | Strobel et al. | July 1, 1958 |

UNITED STATES PATENT OFFICE
CERTIFICATE OF CORRECTION

Patent No. 3,102,109

August 27, 1963

Willy Steinemann

It is hereby certified that error appears in the above numbered patent requiring correction and that the said Letters Patent should read as corrected below.

Column 2, line 54, for "weekly" read -- weakly --; line 55, for "ph" read -- pH --; column 3, line 11, for "ge" read -- be --; line 39, for "weekly" read -- weakly --.

Signed and sealed this 5th day of May 1964.

(SEAL)
Attest:
ERNEST W. SWIDER

Attesting Officer

EDWARD J. BRENNER
Commissioner of Patents